United States Patent [19]

McKinnon et al.

[11] 4,224,544
[45] Sep. 23, 1980

[54] FAN MOTOR HAVING REVERSIBLE ROTOR

[76] Inventors: Eugene T. McKinnon, 16536 Chattanooga Pl., Pacific Palisades, Calif. 90272; Alvin S. Drutz, 11613 Clover Ave., Los Angeles, Calif. 90066; James B. Nelson, deceased, late of Fullerton, Calif.; Lorraine Nelson, executrix, 1118 E. Glenwood, Fullerton, Calif. 92631

[21] Appl. No.: 948,866

[22] Filed: Oct. 5, 1978

[51] Int. Cl.³ .............................................. H02K 5/16
[52] U.S. Cl. ................................. 310/90; 310/49 R; 310/254
[58] Field of Search ............................ 310/162–164, 310/49 R, 90, 91, 46, 254, 211

[56] References Cited

U.S. PATENT DOCUMENTS

| | | | |
|---|---|---|---|
| 2,245,433 | 6/1941 | Delmonte | 310/90 X |
| 2,606,083 | 8/1952 | Kitto et al. | 310/90 UX |
| 3,496,632 | 2/1970 | Deming et al. | 310/211 X |
| 3,500,087 | 3/1970 | Wendt | 310/90 |
| 3,521,098 | 7/1970 | Jesse | 310/163 |
| 3,743,871 | 7/1973 | Church | 310/90 |
| 3,935,489 | 1/1976 | Church et al. | 310/90 |
| 4,156,821 | 5/1979 | Kurome | 310/90 X |

*Primary Examiner*—Mark O. Budd
*Attorney, Agent, or Firm*—Donald M. Cislo

[57] ABSTRACT

A fan motor which has unique design elements and configuration to allow reversible disposition of the rotor so as to make same either clockwise or counter-clockwise rotatable. The motor also utilizes unique mounting elements and arrangements so as to facilitate co-assembly with the device with which it is to be used, more specifically, so that the motor may be utilized to drive a fan in domestic and commercial refrigerators and like refrigeration appliances.

10 Claims, 7 Drawing Figures

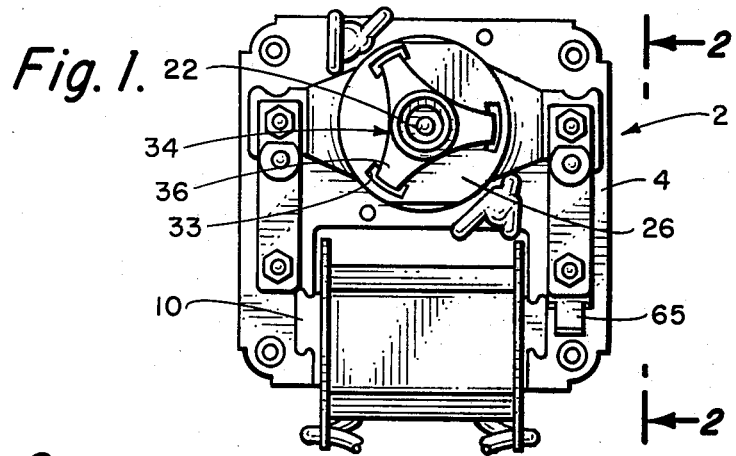
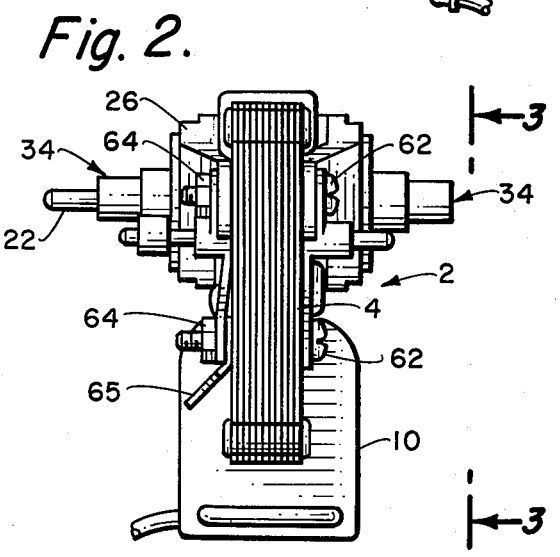
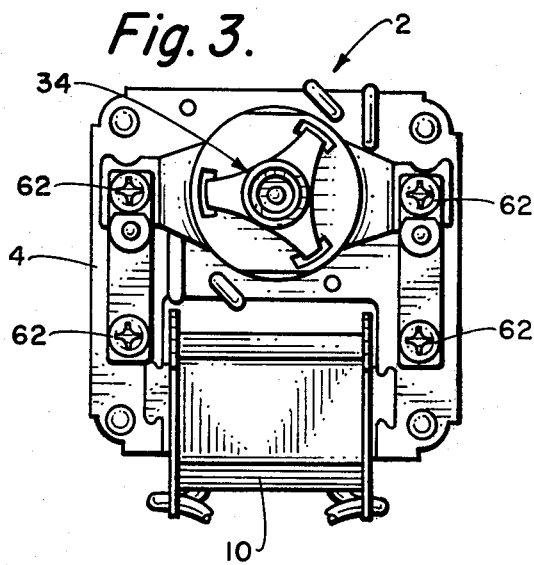
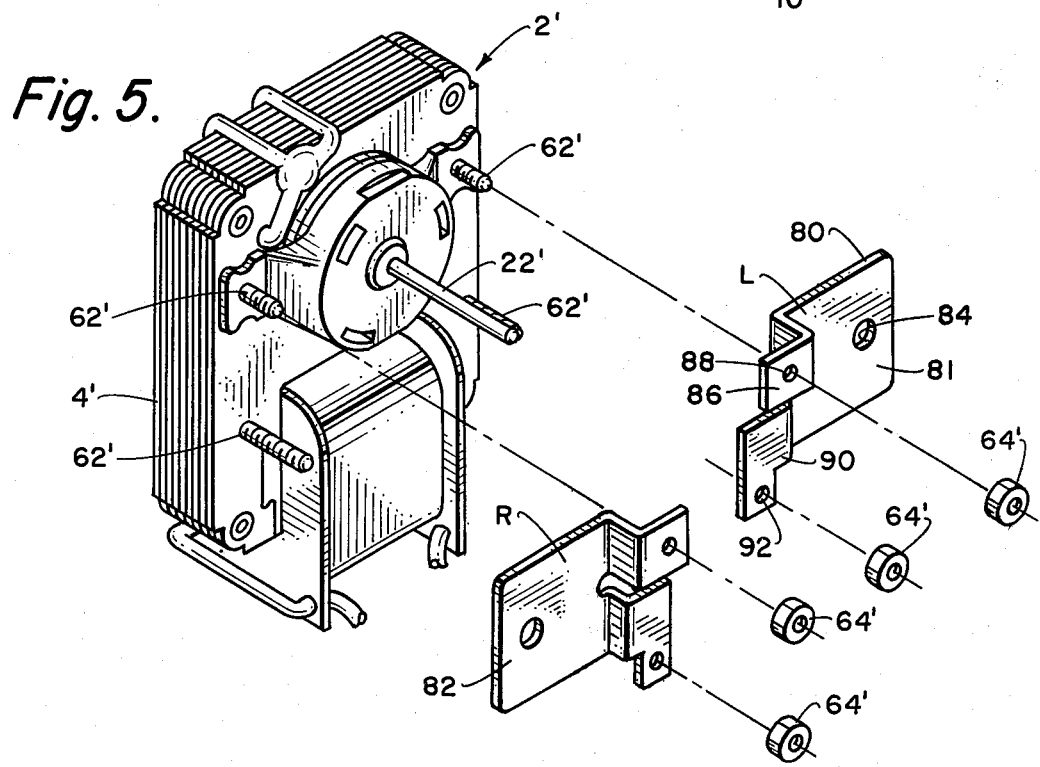

FAN MOTOR HAVING REVERSIBLE ROTOR

BACKGROUND OF THE INVENTION

Equipment manufacturers supplying the aftermarket of various ubiquitously found appliances, such as refrigerators, are faced with serious drawbacks in providing replacement parts which are compatible with the various appliances made by the multitude of manufacturers.

In some instances, the original equipment manufactured by the appliance manufacturers requires unique, specialized subcomponents, such as motors used to drive fans used in conjunction with the refrigeration devices, which requires that the after-market supplier either make specialized component parts to satisfy the individual appliance's needs or alternately devise a replacement component part which may be suitable for use in a plurality of various manufacturer's appliances.

In the case where a fan motor needs replacement in a refrigerator or like appliance (which happens frequently in that electric motors break down or wear out because of the continuous use required of same), an after-market manufacturer is faced with providing a motor which is capable of having a rotor which is either clockwise rotatable or counterclockwise rotatable depending upon the specific demands for that particular appliance. Additionally, each of the appliance manufacturers have a slightly different design thereby requiring or necessitating specific mounting brackets or configuration to the motor which is to be replaced.

It becomes highly desirable to have a replacement part such as a refrigerator fan motor which is universal in the sense that it may be utilized for a plurality of different manufacturer's appliances, and that attribute not only lowers the cost of manufacturing a replacement motor, but also lowers inventory and other costs attendant therewith.

Thus, this invention is directed to an electric fan motor which is universally mountable in conjunction with a multiplicity of refrigerators and the like appliances wherein the motors are intended to replace the original equipment or part which requires replacement.

OBJECTS AND SUMMARY OF THE INVENTION

It is an object of the invention to provide a refrigerator fan-type motor which is adaptable for universal mounting and for universal use with a plurality of different model refrigerators.

It is still another, important object of the invention to provide a fan motor wherein the configuration and mounting of the rotor in conjunction with the stator is such to allow the rotor to be mounted either for clockwise or counterclockwise rotation with respect to the stator.

It is still a further, more important object of the invention to provide a motor of the fan-type which is highly versatile and flexible with respect to its co-action and combination with various refrigerator models and makes.

It is still another, further, more important object of the invention to provide, as a replacement part, a fan motor for use with refrigerators which is easily adaptable for association with the refrigerator and compatible therewith.

It is still another, more specific, important object of the invention to provide an easily mounted, electric motor of the fan-type, which is intended to replace original equipment manufactured by a plurality of refrigerator manufacturers.

These, and further objects of the invention, will become apparent from the hereinafter following commentary taken in conjunction with the drawings.

In an exemplary embodiment, the invention is directed to an electric motor of the refrigerator fan-type having a stator of a plurality of plates such plates having a pair of at least two, aligned, spaced apart through holes; a releasably disposed rotor module supported for selective rotation with said stator; a bearing-encompassing bracket member disposed on each side of said rotor module in supportive relationship therewith, and electric motor support brackets for supporting said electric motor disposed on each side of said stator, said bearing bracket members and electric motor support brackets being releasably retained in cooperative relationship to said stator by retaining means disposed in said through holes and retaining said members in said stator, said bearing-encompassing bracket member having an interior recess for carrying a source of lubricant to lubricate a bearing and a bearing member disposed in each of said bearing-encompassing bracket members so that said bearing supports said shaft of said rotor module in a lubricated manner, said bearing-encompassing bracket member, having radially spaced slots, adapted to receive a grommet mounting member having a Y-configuration, with a central protuberance with friction-retaining legs adapted to be snap-fitted into said radially spaced slots, in releasable friction retaining fashion, therewith.

Other objects and advantages of the invention will be apparent from the following specification and the accompanying drawings which are for the purpose of illustration only.

BRIEF DESCRIPTION OF THE DRAWINGS

FIG. 1 is a front view of one embodiment of the electric motor of this invention;

FIG. 2 is a view taken along the line 2—2 of FIG. 1;

FIG. 3 is a view taken along the line 3—3 of FIG. 2;

FIG. 5 is a perspective view of another embodiment of the invention showing other mounting means for the motor;

Figure 4:
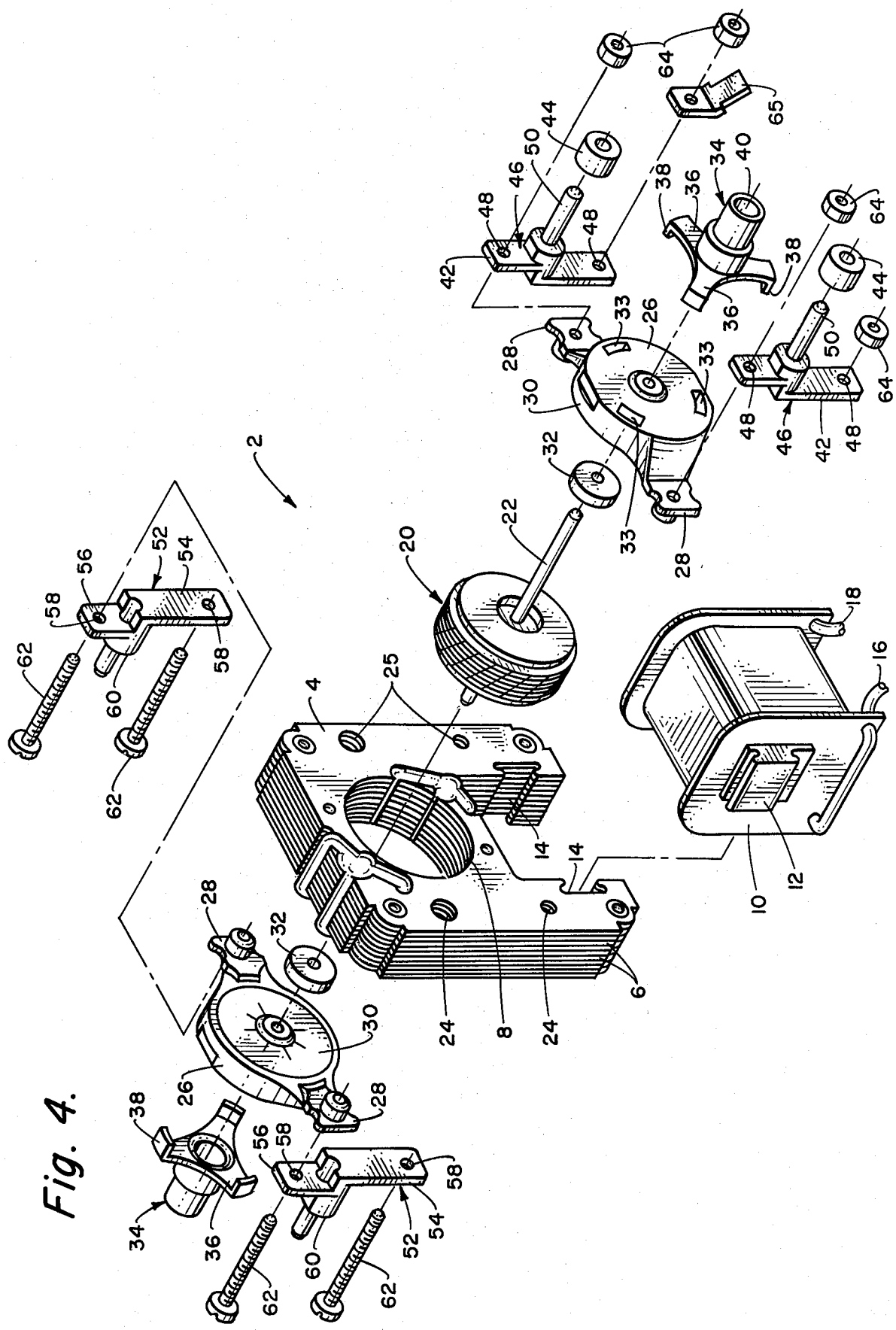
FIG. 4 is an exploded view of the electric motor depicted in FIGS. 1-3 inclusive.

DESCRIPTION OF THE BEST EMBODIMENTS CONTEMPLATED:

Referring to the drawings wherein like numerals of reference will designate like elements throughout, and referring specifically to FIGS. 1-4 inclusive, the motor 2 of the invention is shown as comprising a stator 4 made up of a plurality of plates 6 and having the usual central rotor housing portion 8 with coil 10 having mounting clips 12 to be received by channels 14 in the conventional and well-known fashion, as is found in the electric motor art.

Wires 16 and 18 are adapted for connection to an electrical energy source not shown. The rotor module 20 having shaft 22 of desirable length is adapted for removable rotational mounting in rotor housing 8 formed by stator 4.

The stator 4 is provided with at least a pair of aligned through holes or bores 24 and 25 for receiving therethrough retaining means as will become apparent.

Bearing bracket members 26 are cup-shaped in configuration having tab ends 28 and may be of molded plastic having a central interior recessed portion to accommodate oil pads 30 of absorbent material saturated with a bearing lubricant such as oil.

Bearing members 32 are positioned on either side of rotor module 20 so as to provide adequate beaing support for rotor module 20, and in particular, shaft 22. Bearing encompassing bracket members 26 are positioned on either side of stator 4, and are provided with a plurality of radially spaced slots 33 to receive grommet mount member 34, being somewhat Y-shaped in configuration with tri-legs 36 having tri-foot portions 38 adapted to be snap-fitted, in friction fit releasable arrangement with slots 33. The grommet mount member 34 also has a central protuberance projecting portion 40 for association with the appliance with which the motor 2 is to be used.

It should be noted that the specific fan hub or fan is not illustrated, and in the normal case would be associated with the shaft 22, and in particular, the elongated, projecting end thereof. Those of ordinary skill in the art will at once recognize how such motor 2 would be used in driving a fan for air circulation or other purposes.

A pair of front pin standoff members 42, with associated washers 44, are provided on the front side of stator 4, wherein the pin standoff members 42 have a plate-like portion 46 having through holes 48, and a central projecting pin or post portion 50 also for association and in combination with the frame or structure of the appliance with which it is to be used.

Likewise a pair of rear pin standoff members 52 are utilized having a plate-like portion 54 with offset plate portion 56, each of the two portions having through bores 58, with pin and collar projection portion 60 adapted for combination and co-action with appliance support structure not shown.

The bearing encompassing bracket members and the front pin standoff members 42 and the rear pin standoff members 52 are retained in secure, rigid relationship (with rotor module 20 being disposed between bearing encompassing bracket members 26) by means of through bolts 62 and nut members 64. It should be apparent that should it be desired to change the rotor module rotation from clockwise, as shown in FIG. 4, to counterclockwise, merely entails backing off the nuts 64, removing the front and rear bracket members 42 and 52, and removing front and rear bearing encompassing bracket members 26 to thereby provide free and easy access to the rotor module 20, which may be turned upside down and replaced within the stator housing 8, so that the long end of the shaft 22 projects inward into the sheet of drawing (FIG. 4) instead of out as illustrated in FIG. 4. This then will provide an electric motor 2 with a shaft rotating in a counterclockwise manner. Obviously, to refit the component parts merely entails disposing the elements in the secured, retained position, as previously described, and as illustrated in the drawings.

In the embodiment depicted in FIGS. 1–4 inclusive, the individual bracket and support components, i.e., 26, 34, 42 and 52, are made of molded plastic of the type that would be electrically compatible for the intended use with an electric motor. A male terminal member 64 may also be provided, as illustrated, for ease of electrical connection. With the motor 2 thus described, there is shown an electric motor for replacement purposes and which may be used in refrigeration appliances to drive a fan and fan hub combination not shown, wherein the individual motor is provided with selected rotor rotational capability, and wherein the motor configuration is such so as to be able to receive a variety of motor mounting bracket and means, one type of which has been described and illustrated.

Referring now to the other figures of drawings, the specific components which are only different from that previously described for the motor 2, will now be specifically referred to and discussed.

In the FIG. 5 embodiment, the motor 2' instead of having front and rear pin standoff bracket members is provided with front support or bracket members 80 and 82, adapted for assemblage to the stator 4' by means of through bolts 62' therethrough, and being retained by nuts 64'.

In this instance, the bracket 80 has a first flat portion 81 having a through hole 84 and having a first, stepped leg portion 86 with through hole 88 and having spaced, also stepped, portion 90 with through hole 92, the stepped portions 88 and 90 fitting flushly to the top surface of the stator plates 4, and the through holes 88 and 92 being received upon the through bolts 62', with the aperture 84 being adapted for cooperative association with the cabinet structure of a refrigerator or the like, not shown.

The element or support members 80 is what may be considered a left-hand bracket member, whereas the bracket member 82 is what may be considered a right-hand bracket member, and the configuration is such so as to perform the same functions on the right-hand side of the motor 2' as viewed in FIG. 5, and since the two brackets are essentially the same, keeping in mind the mirror image requirements for left and right-hand members, no further description will be delved into in that those of ordinary skill in the art will at once recognize that the right-hand member 82 will be altered to achieve the same end results as obtained with the bracket member 80.

Figure 6:
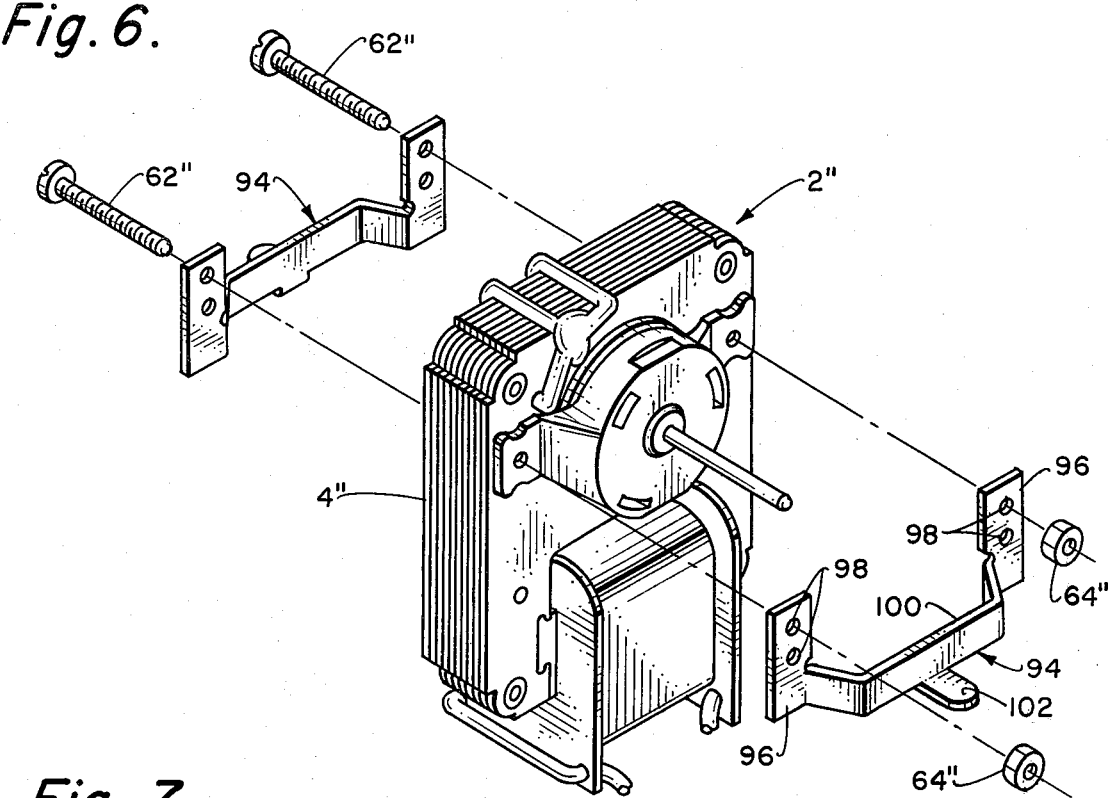
FIG. 6 is a view of still another embodiment similar to that of FIG. 5.

Referring now to FIG. 6, motor 2" is shown utilizing a front and rear tongue mount bracket member 94. In this instance, tongue mount bracket member 94 is adapted to be retained on either side of stator 4" and comprises opposed plate portions 96 having spaced and aligned apertures 98, for retention in one of the apertures 98 on through bolt 62" to be rigidly held in place by nuts 64".

The brackets 94 have an outwardly projecting central portion 100, with an integral protuberance or tongue 102, which is adapted for sliding engagement with a slot or other provision in the refrigerator or appliance support structure, not shown. The brackets 94, therefore, by means of the extending tongue portion 102, will securely support motor 2" in cooperative relationship with the designated appliance.

Figure 7:
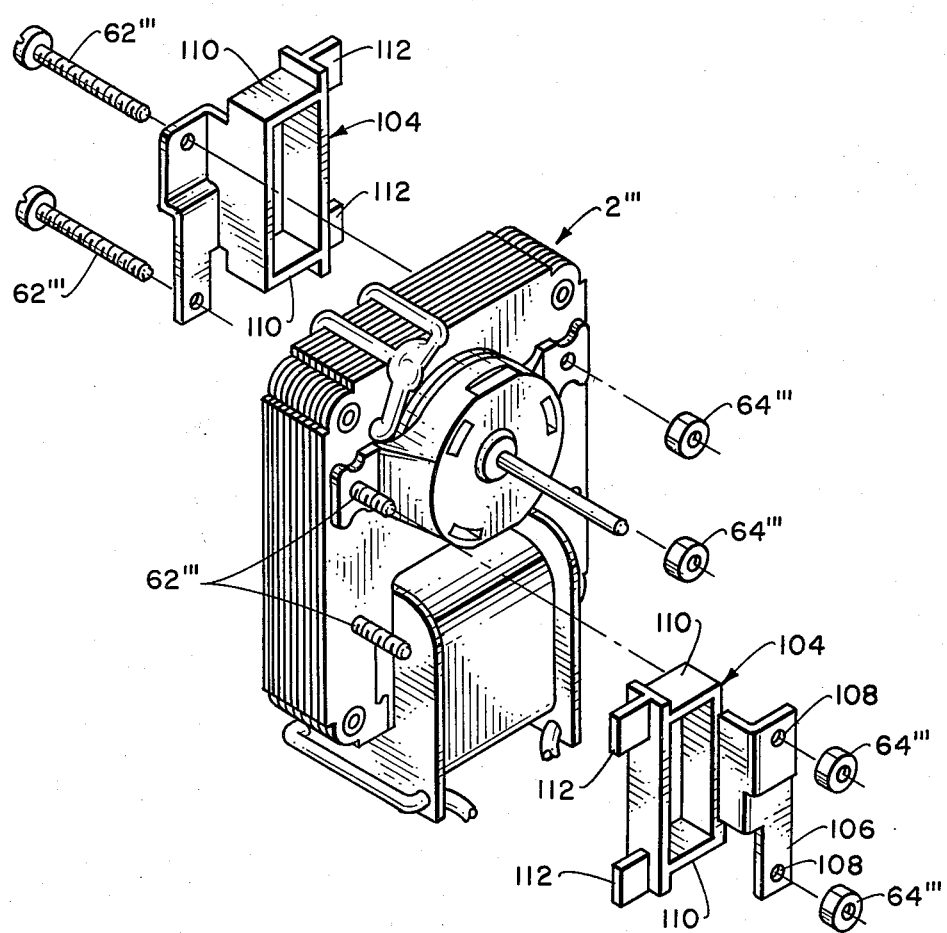
FIG. 7 is still another view of an alternative embodiment similar to that illustrated in FIGS. 5 and 6.

Referring now to FIG. 7, there is shown still another embodiment of the motor 2''', wherein support bracket members for motor 2''' are provided on only one side of the front and one side of the rear of motor 2'''.

In this instance, a front dual tongue bracket 104 has side mounting plate portion 106 with spaced through holes 108 for disposition upon through bolts 62''', and for securement thereon through nuts 64''', as has previously been described for the earlier embodiments.

The front dual tongue bracket 104 has upper and lower extending portions 110, terminating in dual tongues 112, again adapted to be received into cabinet support structure in order to adequately support motor 2''' in cooperation therewith.

The bracket members thus far described, with the exception of 80, 82 and 94, are made of molded plastic, whereas the bracket members 80, 82 and 94 are made of metal. Obviously, other materials of construction for various of the components described and illustrated may be varied, so long as the structural and electrical aspects of the invention are kept in mind.

While the invention has been described with specific and particular reference to specific configuration and design aspects, and with regard to specific materials, those of ordinary skill in the art will at once recognize that certain changes, alterations and modifications may be made, and these, indeed, will present themselves as the essence of the invention may be applied to other than the illustrated end uses, and all such changes, alterations and modifications are intended to be covered by the appended claims.

Thus, there has been described and illustrated a uniquely configured and fabricated electrical motor for use in driving a fan in a refrigerator appliance which may be used in conjunction with a variety of different models of the appliance, and wherein the rotor of the electric motor may be easily changed from clockwise to counterclockwise rotation.

We claim:

1. An electric motor of the refrigerator fan-type having a stator of a plurality of plates, said plates having a pair of at least two, aligned, spaced apart through holes; a releasably disposed rotor module supported for selective rotation within said stator; a bearing encompassing bracket member disposed on each side of said rotor module in supportive relationship therewith and electric motor support brackets for supporting said electric motor disposed on each side of said stator, said bearing bracket members and electric motor support brackets being releasbly retained in cooperative relationship by retaining means disposed in said through holes and retaining said members, said bearing-encompassing bracket members having an interior recess for carrying a source of lubricant and a bearing member in juxtaposition therewith for supporting the shaft of said rotor module, said bearing-encompassing bracket members having radially spaced slots adapted to receive a grommet mounting member having a Y-configuration with a central protuberance, with friction-retaining legs, snap-fitted into said radially spaced slots in releasable friction-retaining fashion.

2. The electric motor, in accordance with claim 1, wherein said plates comprising said stator are about square in configuration and wherein an electrical coil is associated therewith having wires for connection to a source of electrical energy.

3. The electric motor, in accordance with claim 2, wherein said retaining means are through bolts and associated end nuts.

4. The electric motor, in accordance with claim 3, wherein said bracket support members have projecting stub shafts for adaptive, cooperative support with an appliance housing structure.

5. The electric motor, in accordance with claim 3, wherein said bracket support members comprise spaced apart plate portions adapted to be disposed and retained on said through bolts and having an offset central portion terminating in a centrally protruding tongue portion wherein said portions are integral to form a unitary bracket member.

6. The electric motor, in accordance with claim 3, wherein said bracket member is disposed on one side in the front of said stator, and the other rear bracket member is disposed on the other side of said stator, and wherein said brackets comprise a depending, plate-like portion for disposition on said retaining means, terminating in an integrally, laterally extending portion, having spaced apart tab ends for association with cabinet support structure.

7. The electric motor, in accordance with claim 4, wherein said electric motor includes a grommet mount member being Y-shaped in configuration and wherein said member has a centrally projecting annular portion and a further projecting inwardly set tabular portion for encompassing said shaft of said rotor module, and wherein three leg portions are provided for snap-fitting engagement with the radial slots of said bearing-encompassing bracket member, said Y-shaped grommet mounting member being integrally molded of plastic.

8. The electric motor, in accordance with claim 7, including plastic, annular spaced members for disposition on said projecting stub shafts.

9. The electric motor, in accordance with claim 8, wherein the lower portion of said stator plates is discontinuous and forms a receiving slot for the coil of said electric motor.

10. The electric motor in accordance with claim 9 wherein the interior, lower portions of said plates forming said stator are channeled, and said coil member is provided with lateral channel members for mating, sliding engagement in said channels of said plates for secured association therewith.

* * * * *